US009599256B2

(12) United States Patent
Konno

(10) Patent No.: US 9,599,256 B2
(45) Date of Patent: Mar. 21, 2017

(54) FLEXIBLE TUBE, FLEXIBLE HOSE, AND MANUFACTURING METHOD OF FLEXIBLE TUBE

(71) Applicant: KOKUSAN RASENKAN CO., LTD., Tokorozawa-shi (JP)

(72) Inventor: Masato Konno, HongKong (CN)

(73) Assignee: KOKUSAN RASENKAN CO., LTD., Tokorozawa-shi (JP)

( * ) Notice: Subject to any disclaimer, the term of this patent is extended or adjusted under 35 U.S.C. 154(b) by 0 days.

(21) Appl. No.: 14/919,158

(22) Filed: Oct. 21, 2015

(65) Prior Publication Data
US 2016/0040805 A1 Feb. 11, 2016

Related U.S. Application Data

(63) Continuation of application No. PCT/JP2013/064677, filed on May 27, 2013.

(51) Int. Cl.
*F16L 11/12* (2006.01)
*F16L 11/16* (2006.01)
(Continued)

(52) U.S. Cl.
CPC ............ *F16L 11/121* (2013.01); *F16L 11/127* (2013.01); *F16L 11/16* (2013.01); *F16L 11/24* (2013.01)

(58) Field of Classification Search
CPC ........ F16L 11/121; F16L 11/127; F16L 11/24; F16L 11/16
(Continued)

(56) References Cited

U.S. PATENT DOCUMENTS 3,626,987 A * 12/1971 Bittner .................... F16L 53/00
138/114
3,674,056 A * 7/1972 D'Aprile ................. F16L 11/16
138/129
(Continued)

FOREIGN PATENT DOCUMENTS

CN 101182897 A 5/2008
CN 202744045 U 2/2013
(Continued)

OTHER PUBLICATIONS

Office Action issued on Sep. 17, 2015 for counterpart Taiwan patent application No. 103114866, with English translation.
(Continued)

*Primary Examiner* — Patrick F Brinson
(74) *Attorney, Agent, or Firm* — Kratz, Quintos & Hanson, LLP

(57) ABSTRACT

A flexible tube formed by interlocking a first edge of a single strip material with a second edge of the strip material that adjoins the first edge by spirally winding the strip material, allowing passage of a solid object, and having a specific length, wherein the flexible tube has a shape of an ellipse in cross-section perpendicular to a direction of the passage, the ellipse having a shape that prevents a torsional force caused by torsion from propagating to a part on which a torsional force concentrates in a flexible tube with a circular cross-section perpendicular to the direction of the passage, and wherein the ellipse has a shape that creates a space for a cable between an outer surface of the ellipse and an inner surface of a covering material having a circular cross-section with a diameter greater than a length of a major axis of the ellipse.

4 Claims, 4 Drawing Sheets

(51) Int. Cl.
    *F16L 11/127*    (2006.01)
    *F16L 11/24*    (2006.01)
(58) Field of Classification Search
    USPC .................. 138/122, 129, 154, 132–134
    See application file for complete search history.

(56) References Cited

U.S. PATENT DOCUMENTS

| | | | |
|---|---|---|---|
| 4,129,152 A * | 12/1978 | Davis | B21C 37/123 |
| | | | 138/103 |
| 4,862,924 A * | 9/1989 | Kanao | F16L 11/16 |
| | | | 138/122 |
| 5,096,521 A | 3/1992 | Schouten | |
| 5,806,567 A * | 9/1998 | Fukui | F16L 59/153 |
| | | | 138/129 |
| 5,954,096 A * | 9/1999 | Lepoutre | F16L 11/02 |
| | | | 138/129 |
| 6,158,477 A * | 12/2000 | Waters | F16L 11/088 |
| | | | 138/125 |
| 6,237,642 B1 * | 5/2001 | Lepoutre | F16L 9/21 |
| | | | 138/129 |
| 2003/0024585 A1 | 2/2003 | Otsuka | |
| 2004/0194781 A1 | 10/2004 | Fukunaga et al. | |
| 2011/0017304 A1 | 1/2011 | Babl et al. | |

FOREIGN PATENT DOCUMENTS

| | | |
|---|---|---|
| CN | 103047109 A | 4/2013 |
| EP | 0458049 A2 | 11/1991 |
| JP | S54-20946 | 2/1979 |
| JP | S60-67485 | 5/1985 |
| JP | H02-51688 | 2/1990 |
| JP | 05-133497 A | 5/1993 |
| JP | H11-22456 | 1/1999 |
| JP | 11-094126 A | 4/1999 |
| JP | 2001-220806 A1 | 8/2001 |
| JP | 2001-271591 A1 | 10/2001 |
| JP | 2002-243065 A1 | 8/2002 |
| JP | 2003-49981 A1 | 2/2003 |
| JP | 2005-164210 A | 6/2005 |
| JP | 2005-172196 A | 6/2005 |
| JP | 2006-329365 A1 | 12/2006 |
| KR | 20-0223486 Y1 | 5/2001 |

OTHER PUBLICATIONS

Office Action issued on May 5, 2016 in the corresponsing Chinese patent application No. 201380076691.7, with translation.
Office Action issued on Apr. 1, 2016 in the corresponding Korean patent application No. 10-2015-7032130, with translation.
International Search Report for International Application No. PCT/JP2013/064677 dated Aug. 6, 2013.
Office Action issued on Sep. 6, 2016 in the corresponding Chinese patent application No. 201380076691.7, with English translation.
Office Action issued on Sep. 26, 2016 in counterpart Korean Patent Application No. 10-2015-7032130, with translation.

* cited by examiner

INTERLOCK TYPE

SIMI-INTERLOCK TYPE

FLEXIBLE TUBE, FLEXIBLE HOSE, AND MANUFACTURING METHOD OF FLEXIBLE TUBE

CROSS-REFERENCE TO RELATED APPLICATION

This application is a continuation application of International Patent Application No. PCT/JP2013/064677 filed on May 27, 2013 and designated the U.S., the entire contents of which are incorporated herein by reference.

FIELD

A certain aspect of embodiments described herein relates to a flexible tube, a flexible hose, and a manufacturing method of the flexible tube.

BACKGROUND

Flexible tubes formed by spirally winding a wire are also known as flexible pipes, and have a variety of shapes and sizes. The flexible tubes are widely used for piping, joints, and as protecting tubes or underground pipes. The flexible tubes include interlock flexible tubes having capabilities of retaining the bending shape thereof, and semi-interlock flexible tubes having better resistance to lateral pressure as well as to torsion and tension.

The interlock flexible tube has a packing inserted into interlocking parts of adjoining wires as disclosed in FIG. 19(a) of Japanese Patent Application Publication No. 2002-243065 (Patent Document 1). The inserted packing prevents water leakage while water directly flows through the tube. Thus, the interlock flexible tubes are employed for water heaters, water discharge tubes of water purifiers, and faucets.

In contrast, the semi-interlock flexible tubes have no packing but have adjoining wires firmly interlocking with each other as disclosed in FIG. 19(b) of Patent Document 1. The semi-interlock flexible tube has an inner tube (e.g., a water flow tube) inside it, and is used as, for example, a shower hose.

In addition to the aforementioned flexible tubes, there has been known flexible tubes with an ellipsoidal cross-section for automotive exhaust pipes that require high heat resistance to high-temperature exhaust gasses as disclosed in Japanese Patent Application Publication No. 11-22456 (Patent Document 2).

SUMMARY

According to an aspect of the present invention, there is provided a flexible tube formed by interlocking a first edge of a single strip material with a second edge of the strip material that adjoins the first edge by spirally winding the strip material, allowing passage of a liquid or a solid object, and having a specific length, wherein the flexible tube has a shape of an ellipse in cross-section perpendicular to a direction of the passage of the liquid or the solid object, the ellipse having a shape that prevents a torsional force caused by torsion from propagating to a part on which a torsional force concentrates in a flexible tube with a perfect circular cross-section perpendicular to the direction of the passage of the liquid or the solid object when the flexible tube is twisted along an entire length of the specific length in a winding direction of the strip material or an opposite direction of the winding direction, and wherein the ellipse has a shape that creates a space for a cable between an outer surface of the ellipse and an inner surface of a covering material having a perfect circular cross-section with a diameter greater than a length of a major axis of the ellipse when the covering material covers over the flexible tube.

According to another aspect of the present invention, there is provided a flexible tube formed by interlocking a first edge of a single strip material with a second edge of the strip material that adjoins the first edge by spirally winding the strip material, allowing passage of a liquid or a solid object, and having a specific length, wherein the flexible tube has a shape of an ellipse in cross-section perpendicular to a direction of the passage of the liquid or the solid object, the ellipse having a shape that prevents a torsional force caused by torsion from propagating to a part on which a torsional force concentrates in a flexible tube with a perfect circular cross-section perpendicular to the direction of the passage of the liquid or the solid object when the flexible tube is twisted along an entire length of the specific length in a winding direction of the strip material or an opposite direction of the winding direction, and wherein the ellipse has a shape that creates a space for a cable between an inner surface of the ellipse and an outer surface of a tube having a perfect circular cross-section with a diameter less than a length of a minor axis of the ellipse when the tube passes through an inside of the flexible tube.

According to another aspect of the present invention, there is provided a flexible hose comprising: a flexible tube formed by interlocking a first edge of a single strip material with a second edge of the strip material that adjoins the first edge by spirally winding the strip material, allowing passage of a liquid or a solid object, having a specific length, and having a shape of an ellipse in cross-section perpendicular to a direction of the passage of the liquid or the solid object, the ellipse having a shape that prevents a torsional force caused by torsion from propagating to a part on which a torsional force concentrates in a flexible tube with a perfect circular cross-section perpendicular to the direction of the passage of the liquid or the solid object when the flexible tube is twisted along an entire length of the specific length in a winding direction of the strip material or an opposite direction of the winding direction; and a covering material formed around the flexible tube and having a perfect circular cross-section with a diameter greater than a length of a major axis of the ellipse.

According to another aspect of the present invention, there is provided a flexible hose comprising: a flexible tube formed by interlocking a first edge of a single strip material with a second edge of the strip material that adjoins the first edge by spirally winding the strip material, allowing passage of a liquid or a solid object, having a specific length, and having a shape of an ellipse in cross-section perpendicular to a direction of the passage of the liquid or the solid object, the ellipse having a shape that prevents a torsional force caused by torsion from propagating to a part on which a torsional force concentrates in a flexible tube with a perfect circular cross-section perpendicular to the direction of the passage of the liquid or the solid object when the flexible tube is twisted along an entire length of the specific length in a winding direction of the strip material or an opposite direction of the winding direction; and a tube formed inside the flexible tube and having a perfect circular cross-section with a diameter less than a length of a minor axis of the ellipse.

According to another aspect of the present invention, there is provided a flexible hose comprising: a flexible tube formed by interlocking a first edge of a single strip material with a second edge of the strip material that adjoins the first edge by spirally winding the strip material, allowing passage of a liquid or a solid object, having a specific length, and having a shape of an ellipse in cross-section perpendicular to a direction of the passage of the liquid or the solid object, the ellipse having a shape that prevents a torsional force caused by torsion from propagating to a part on which a torsional force concentrates in a flexible tube with a perfect circular cross-section perpendicular to the direction of the passage of the liquid or the solid object when the flexible tube is twisted along an entire length of the specific length in a winding direction of the strip material or an opposite direction of the winding direction; and a tube formed inside the flexible tube and having a perfect circular cross-section with a diameter less than a length of a minor axis of the ellipse.

According to another aspect of the present invention, there is provided a manufacturing method of a flexible tube, the method comprising: forming a perfect circular cross-section flexible tube having a shape of a perfect circle in cross-section perpendicular to a direction of passage of a liquid or a solid object and having a specific length by interlocking a first edge of a single strip material with a second edge of the strip material that adjoins the first edge by spirally winding the strip material; and pressing an outer periphery of the perfect circular cross-section flexible tube so that the cross-section has a shape of an ellipse that prevents a torsional force caused by torsion from propagating to a part on which a torsional force concentrates in the perfect circular cross-section flexible tube when the perfect circular cross-section flexible tube is twisted along an entire length of the specific length in a winding direction of the strip material or an opposite direction of the winding direction, wherein the ellipse has a shape that creates a space for a cable between an outer surface of the ellipse and an inner surface of a covering material having a perfect circular cross-section with a diameter greater than a length of a major axis of the ellipse when the covering material covers over the flexible tube.

According to another aspect of the present invention, there is provided a manufacturing method of a flexible tube, the method comprising: forming a perfect circular cross-section flexible tube having a shape of a perfect circle in cross-section perpendicular to a direction of passage of a liquid or a solid object and having a specific length by interlocking a first edge of a single strip material with a second edge of the strip material that adjoins the first edge by spirally winding the strip material; and pressing an outer periphery of the perfect circular cross-section flexible tube so that the cross-section has a shape of an ellipse that prevents a torsional force caused by torsion from propagating to a part on which a torsional force concentrates in the perfect circular cross-section flexible tube when the perfect circular cross-section flexible tube is twisted along an entire length of the specific length in a winding direction of the strip material or an opposite direction of the winding direction, wherein the ellipse has a shape that creates a space for a cable between an inner surface of the ellipse and an outer surface of a tube having a perfect circular cross-section with a diameter less than a length of a minor axis of the ellipse when the tube passes through an inside of the flexible tube.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

The aforementioned flexible tubes employed for water facilities typically have a shape of a perfect circle in cross-section perpendicular to the direction of water flow. However, when a torsional force is applied on such flexible tubes in the winding direction of the wire or in the opposite direction of the winding direction, the torsional force easily concentrates on a specific part of the wire. This decreases the retention ability of the interlock flexible tube to retain its form. In the case of the semi-interlock flexible tube, a fracture due to torsion easily occurs from the part on which the torsional force concentrates. Patent Documents 1 and 2 have no mention of such degradation of the characteristics of the flexible tube.

The following describes modes for carrying out the present invention with reference to the attached drawings.

Figure 1:
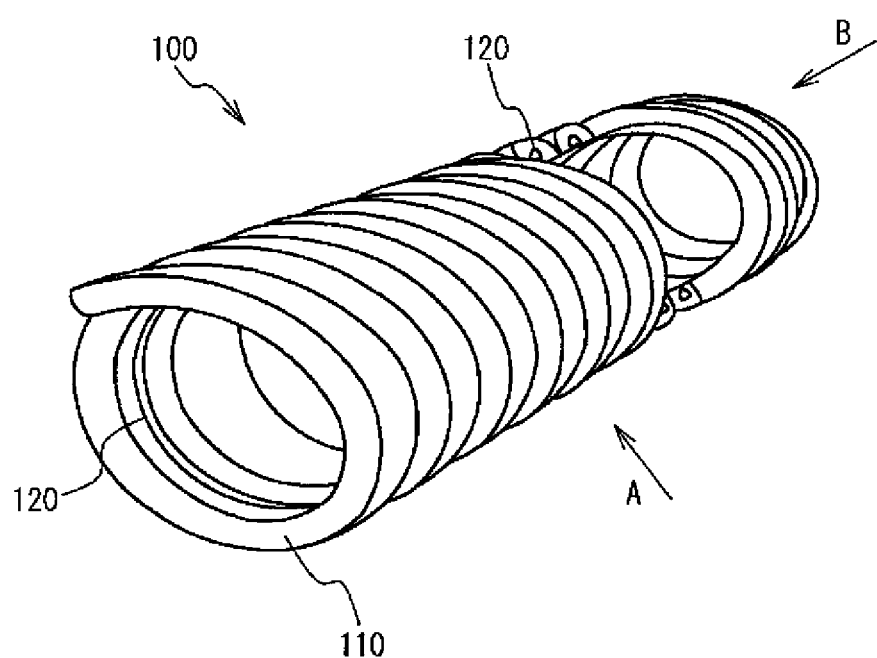
FIG. 1 is a perspective view illustrating an interlock flexible tube.
Figure 2A:
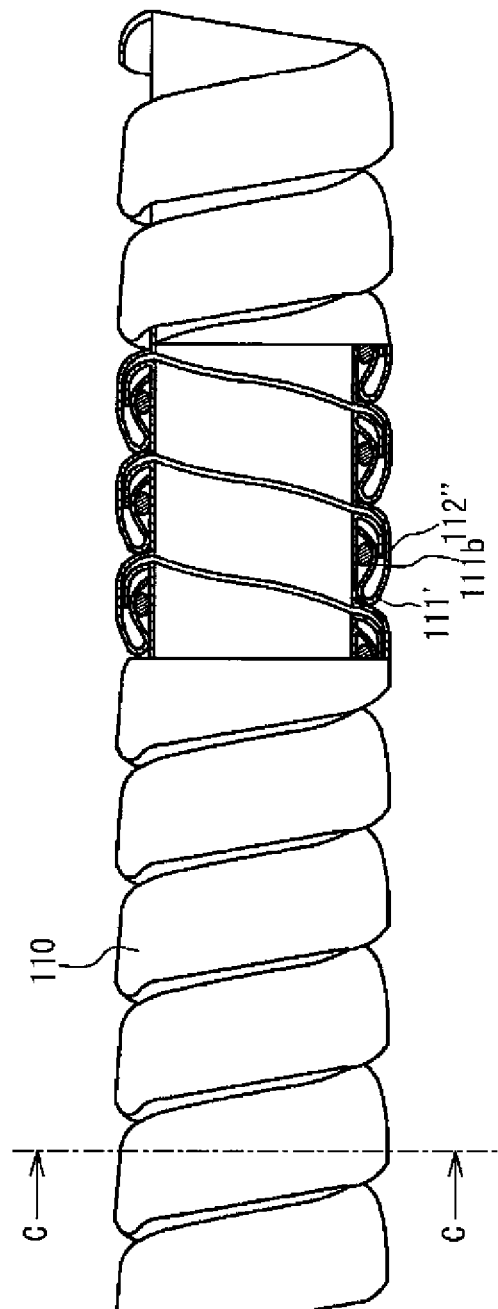
FIG. 2A is a side view of the interlock flexible tube.
Figure 2B:
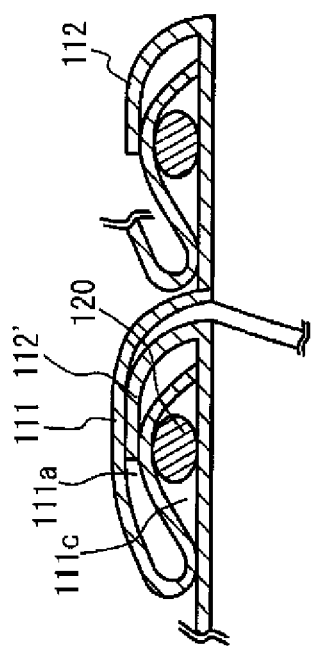
FIG. 2B is a partial cross-sectional view of the flexible tube illustrated in FIG. 2A.

FIG. 1 is a perspective view illustrating an interlock flexible tube 100. FIG. 2A is a side view of the interlock flexible tube 100. Specifically, FIG. 2A is a side view viewed in the direction indicated by arrow A in FIG. 1. FIG. 2B is a partial cross-sectional view of the flexible tube 100 illustrated in FIG. 2A. Specifically, FIG. 2B is a cross-sectional view enlarging two right segments out of three upper segments shown in section in FIG. 2A. The flexible tube 100 is partially cut out for exhibiting the internal structure of the flexible tube 100 in FIG. 1 and FIG. 2A.

A wire 110 is spirally wound to form the flexible tube 100 as illustrated in FIG. 1. More specifically, as illustrated in FIGS. 2A and 2B, a first edge 111 in the longitudinal direction of the wire 110 is bent in inverse R shape. On the other hand, a second edge 112 in the longitudinal direction of the wire 110 is bent in inverse J shape. The tip of a second edge 112' that adjoins the first edge 111 due to the winding of the wire 110 is inserted into and fitted in an inner space 111a formed by the inverse-R-shaped first edge 111. This allows the wire 110 and the adjoining wire 110 to interlock with one another. The wire is sometimes called a plate material or a strip material. The wire, the plate material, or the strip material may be made of stainless steel.

When the both ends of the flexible tube 100 are held and subjected to downward force in FIG. 2A to bend the flexible tube 100, the tip of the second edge 112' that forms the outer surface of the bent flexible tube 100 (see FIG. 2B) moves in the direction coming from out of the inner space formed by the inverse-R-shaped first edge 111 while remaining fitted in the space 111a. On the other hand, the tip of a second edge 112" that forms the inner surface of the bent flexible tube 100 moves in the direction coming into the inside formed by an inverse-R-shaped first edge 111' while remaining fitted in an space 111b. As described above, even when the flexible tube 100 is bent, the tip of the second edge 112' remains fitted in the space 111a, and the tip of the second edge 112" remains fitted in the space 111b. Therefore, the flexible tube 100 retains its bending form. Since the wire 110 is spirally wound, the second edge 112" goes to and comes back from the back of the paper to correspond to the second edge 112'. In the same manner, the first edge 111' goes to and comes back from the back of the paper to correspond to the first edge 111.

As illustrated in FIG. 2B, a space 111c is formed between the outer surface of the inverse-R-shaped first edge 111 and the outer periphery of the wire 110 that adjoins the first edge 111 due to the winding. A packing 120 is inserted into the space 111c. The packing 120 prevents water leakage. This means that leakage of liquids is prevented even when liquids, including water and hot water, flow through the flexible tube 100. The packing 120 may be cotton yarn, or rubber. The packing 120 may not be inserted depending on the use application of the flexible tube 100.

The flexible tube with a perfect circular cross-section is formed by spirally winding a wire around a shaft with a perfect circular cross-section together with a packing while keeping the wire and the adjacent wire interlocked. The shaft is then pulled when the flexible tube has a target length. This process completes a flexible tube that has a specific length and a perfect circular cross-section. The cross-section shape of the flexible tube is preferably as close to a perfect circle as possible, but may be almost a perfect circle including error. When the wire is wound, shafts corresponding to the inner diameters of flexible tubes are used. This enables the completion of flexible tubes having a variety of inner diameters. Solid objects such as cables may pass through the completed flexible tube instead of liquids. The cables may be communication lines such as optical fibers and communication cables, or conducting wires such as electric cords.

The flexible tube 100 with an ellipsoidal cross-section is now described with reference to FIG. 3 and FIG. 4.

Figure 3:
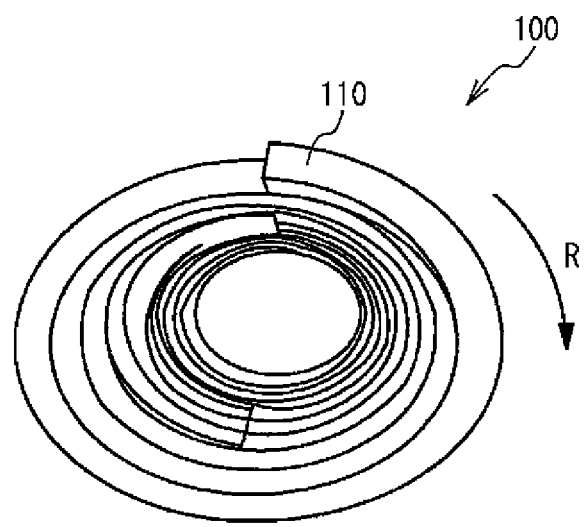
FIG. 3 is a front view of the interlock flexible tube.

FIG. 3 is a front view illustrating the interlock flexible tube 100. Specifically, FIG. 3 is a front view of the interlock flexible tube 100 viewed from the direction indicated by arrow B in FIG. 1. FIG. 4 is a cross-sectional view illustrating the interlock flexible tube 100. Specifically, FIG. 4 schematically illustrates the cross-section of the interlock flexible tube 100 taken along line C-C in FIG. 2A.

Figure 4:
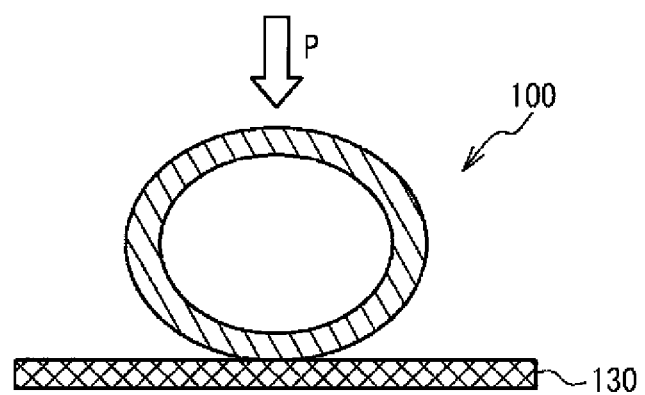
FIG. 4 is a cross-sectional view of the interlock flexible tube.

As illustrated in FIG. 3 and FIG. 4, the flexible tube 100 has a shape of an ellipse in cross-section perpendicular to the flow of liquids or the path of solid objects. The cross-section shape of the flexible tube 100 is preferably as close to a perfect ellipse as possible, but may be almost a perfect ellipse including error. To form the flexible tube 100 with an ellipsoidal cross-section, a flexible tube with a perfect circular cross-section is placed on a flat mounting table 130 and its outer periphery is pressed down by uniform force in the longitudinal direction as indicated by arrow P in FIG. 4. This means that the flexible tube with a perfect circular cross-section is pressed down and deformed, becoming the flexible tube 100 having an ellipsoidal cross-section. A first side of a flexible tube with a perfect circular cross-section may be put on a flat surface and pressed from a second side. Pressure may be applied one time or several times to complete the flexible tube 100 with an ellipsoidal cross-section.

When the completed flexible tube 100 with an ellipsoidal cross-section is twisted in the winding direction of the wire 110 or in the opposite direction of the winding direction, the ellipse deforms to a shape that reduces the propagation of the torsional force caused by the torsion to the part on which the torsional force concentrates in a flexible tube with a perfect circular cross-section. This allows the flexible tube 100 with an ellipsoidal cross-section to enhance its retention ability to retain its form even when it is twisted in the winding direction of the wire 110 or the opposite direction of the winding direction.

For example, referring to FIG. 3, when a flexible tube with a perfect circular cross-section (not illustrated) is twisted in the opposite direction of the winding direction of the wire at the front of the paper while the flexible tube is fixed at the back of the paper, the torsional force propagates through the single spirally-wound-wire and easily concentrates on the fixed part because the cross-section has a shape of a perfect circle. In contrast, as illustrated in FIG. 3, when the flexible tube 100 with an ellipsoidal cross-section is twisted in the opposite direction of the winding direction of the wire 110 at the front of the paper as indicated by arrow R while the flexible tube 100 is fixed at the back of the paper, the torsional force is reduced on the major axis of the ellipse and less propagates at closer distances to the back of the paper because the cross-section has an ellipsoidal shape. In other words, the torsional force is distributed from the front to back of the paper, and is prevented from concentrating on a specific part. Thus, the flexible tube 100 with an ellipsoidal cross-section enhances its retention ability to retain its form even when twisted in the winding direction of the wire 110 or in the opposite direction of the winding direction. The same is true when the flexible tube 100 with an ellipsoidal cross-section is twisted in the direction same as the winding direction of the wire 110.

The interlock flexible tube 100 has been described, but the propagation of torsional force to the concentration part is also reduced in a semi-interlock flexible tube for the same reason. This reduces the occurrence of a fracture caused by torsion from the concentration part. In other words, when the flexible tube 100 is a semi-interlock flexible tube, it has better resistance to a fracture caused by torsion.

A first U-shaped edge, which is formed by bending a wire, and a second U-shaped edge, which adjoins the first U-shaped edge due to the winding of the wire, firmly interlock with each other to form a semi-interlock flexible tube. The semi-interlock flexible tube has no space in the interlocking part unlike an interlock flexible tube, or has an exceedingly-small space compared to the interlock flexible tube, thus having no retention ability to retain its form. However, it has not only better resistance to torsion, tension, and lateral pressure but also good flexibility.

Figure 5A:
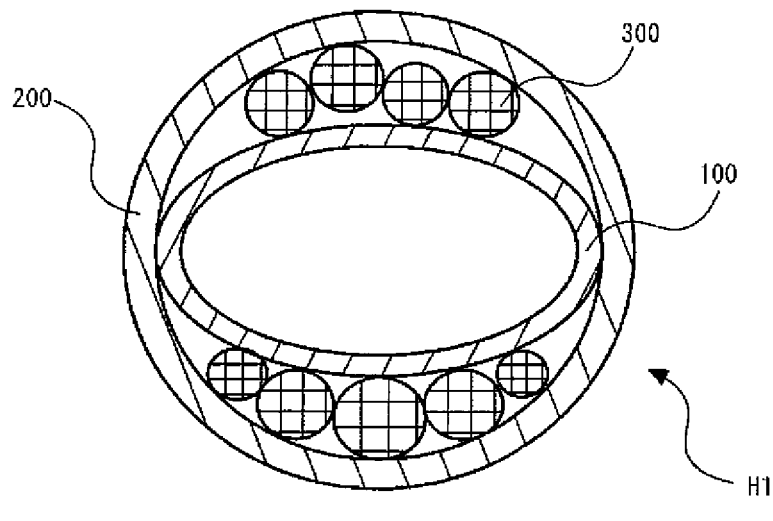
FIG. 5A is a cross-sectional view illustrating a flexible hose including an interlock flexible tube covered with a covering material.
Figure 5B:
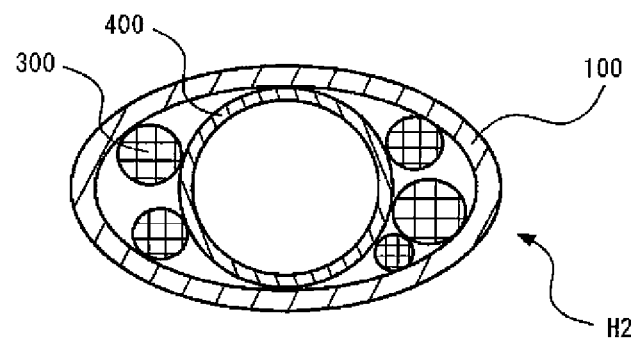
FIG. 5B is a cross-sectional view illustrating a flexible hose including a semi-interlock flexible tube having an inner tube.

Furthermore, the ellipsoidal cross-section allows the interlock flexible tube 100 and the semi-interlock flexible tube to have a variety of space inside and outside the flexible tube. For example, as illustrated in FIG. 5A, a flexible hose H1 including a covering material 200, which has a perfect circular cross-section with a diameter greater than the length of the major axis of the ellipse and covers over the interlock flexible tube 100, has a space formed between the flexible tube and the covering material in the minor axis of the ellipse. The covering material may be synthetic resin such as Polyvinyl Chloride (PVC), polyolefin, and silicon. As illustrated in FIG. 5B, a flexible hose H2 including an inner tube 400, which has a perfect circular cross-section with a diameter less than the length of the minor axis of the ellipse and passes through the inside of a semi-interlock flexible tube, has a space formed between the flexible tube and the inner tube in the major axis of the ellipse. Such formed spaces may be used to pass at least one cable 300 such as a communication line or a conducting wire described above. This enables to provide electrical power to a component of a water facility mounted to a first end of a flexible tube, or to give instructions to controllers mounted to a second end of the flexible tube by hand operation of the component.

Resin may fill the area without the cables 300 of the space to prevent the cables 300 from moving. Any ratio of the length of the major axis to that of the minor axis of the ellipse can be selected as long as a space through which a cable passes is left.

Although the embodiments of the present invention have been described in detail, the present invention is not limited to the above-mentioned embodiments and the various change, substitutions, and alterations could be made hereto without departing from the spirit and scope of the present invention. The aforementioned winding direction is a direction in which the wire 110 is wound around a shaft (a direction in which the inner diameter narrows), and the opposite direction of the winding direction is a direction in which the wire 110 is unwound from the shaft (a direction in which the inner diameter widens).

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. A flexible tube formed by interlocking a first edge of a single strip material with a second edge of the strip material that adjoins the first edge by spirally winding the strip material, allowing passage of a liquid or a solid object, and having a specific length,
   wherein the flexible tube has a shape of an ellipse in cross-section perpendicular to a direction of the passage of the liquid or the solid object, the ellipse having a shape that prevents a torsional force caused by torsion from propagating to a part on which a torsional force concentrates in a flexible tube with a perfect circular cross-section perpendicular to the direction of the passage of the liquid or the solid object when the flexible tube is twisted along an entire length of the specific length in a winding direction of the strip material or an opposite direction of the winding direction, and
   wherein the ellipse has a shape that creates a space for a cable between an outer surface of the ellipse and an inner surface of a covering material having a perfect circular cross-section with a diameter greater than a length of a major axis of the ellipse when the covering material covers over the flexible tube.

2. A flexible tube formed by interlocking a first edge of a single strip material with a second edge of the strip material that adjoins the first edge by spirally winding the strip material, allowing passage of a liquid or a solid object, and having a specific length,
   wherein the flexible tube has a shape of an ellipse in cross-section perpendicular to a direction of the passage of the liquid or the solid object, the ellipse having a shape that prevents a torsional force caused by torsion from propagating to a part on which a torsional force concentrates in a flexible tube with a perfect circular cross-section perpendicular to the direction of the passage of the liquid or the solid object when the flexible tube is twisted along an entire length of the specific length in a winding direction of the strip material or an opposite direction of the winding direction, and
   wherein the ellipse has a shape that creates a space for a cable between an inner surface of the ellipse and an outer surface of a tube having a perfect circular cross-section with a diameter less than a length of a minor axis of the ellipse when the tube passes through an inside of the flexible tube, the outer surface of the tube abutting against the flexible tube.

3. A flexible hose comprising:
   a flexible tube formed by interlocking a first edge of a single strip material with a second edge of the strip material that adjoins the first edge by spirally winding the strip material, allowing passage of a liquid or a solid object, having a specific length, and having a shape of an ellipse in cross-section perpendicular to a direction of the passage of the liquid or the solid object, the ellipse having a shape that prevents a torsional force caused by torsion from propagating to a part on which a torsional force concentrates in a flexible tube with a perfect circular cross-section perpendicular to the direction of the passage of the liquid or the solid object when the flexible tube is twisted along an entire length of the specific length in a winding direction of the strip material or an opposite direction of the winding direction; and
   a covering material formed around the flexible tube and having a perfect circular cross-section with a diameter greater than a length of a major axis of the ellipse.

4. A flexible hose comprising:
   a flexible tube formed by interlocking a first edge of a single strip material with a second edge of the strip material that adjoins the first edge by spirally winding the strip material, allowing passage of a liquid or a solid object, having a specific length, and having a shape of an ellipse in cross-section perpendicular to a direction of the passage of the liquid or the solid object, the ellipse having a shape that prevents a torsional force caused by torsion from propagating to a part on which a torsional force concentrates in a flexible tube with a perfect circular cross-section perpendicular to the direction of the passage of the liquid or the solid object when the flexible tube is twisted along an entire length of the specific length in a winding direction of the strip material or an opposite direction of the winding direction; and
   a tube formed inside the flexible tube and having a perfect circular cross-section with a diameter less than a length of a minor axis of the ellipse, the outer surface of the tube abutting against the flexible tube.

* * * * *